United States Patent
Kim et al.

(10) Patent No.: US 12,431,531 B2
(45) Date of Patent: Sep. 30, 2025

(54) CATHODE ACTIVE MATERIAL FOR LITHIUM SECONDARY BATTERY AND METHOD OF MANUFACTURING THE SAME

(71) Applicant: SK ON CO., LTD., Seoul (KR)

(72) Inventors: Sang Bok Kim, Daejeon (KR); Jik Soo Kim, Daejeon (KR); Jeong Bae Yoon, Daejeon (KR); Seung Ok Lee, Daejeon (KR); Ji Hoon Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/621,104

(22) Filed: Mar. 29, 2024

(65) Prior Publication Data
US 2024/0291019 A1   Aug. 29, 2024

Related U.S. Application Data

(62) Division of application No. 17/481,535, filed on Sep. 22, 2021, now Pat. No. 11,973,179.

(30) Foreign Application Priority Data

Sep. 24, 2020 (KR) .......... 10-2020-0124161

(51) Int. Cl.
*H01M 10/0525* (2010.01)
*H01M 4/04* (2006.01)
*H01M 4/38* (2006.01)
*H01M 4/525* (2010.01)
*H01M 4/02* (2006.01)

(52) U.S. Cl.
CPC ..... *H01M 10/0525* (2013.01); *H01M 4/0471* (2013.01); *H01M 4/382* (2013.01); *H01M 2004/028* (2013.01); *H01M 4/525* (2013.01)

(58) Field of Classification Search
None
See application file for complete search history.

(56) References Cited

U.S. PATENT DOCUMENTS

2016/0172674 A1*  6/2016  Oda ............... H01M 4/525
                                                  429/223
2018/0309124 A1  10/2018  Kanada et al.

FOREIGN PATENT DOCUMENTS

| CN | 1698220 A | 11/2005 |
|---|---|---|
| CN | 107579244 A | 1/2018 |
| KR | 10-2014-0067508 A | 6/2014 |

OTHER PUBLICATIONS

Office Action for the Korean Patent Application No. 10-2020-0124161 issued by the Korean Intellectual Property Office on Jan. 2, 2025.
Office Action for Chinese Patent Application No. 202111104201.2 issued by the Chinese Patent Office on Apr. 30, 2025.

\* cited by examiner

*Primary Examiner* — Carlos Barcena
(74) *Attorney, Agent, or Firm* — IP & T GROUP LLP

(57) ABSTRACT

A cathode active material for a lithium secondary battery is provided. The cathode active material includes lithium-transition metal composite oxide particles having a crystallite size of 120 nm or less in a (104) plane direction measured through X-ray diffraction (XRD) analysis, and a ratio of the crystallite size of the lithium-transition metal composite oxide particle in the (104) plane direction to a crystallite size thereof in a (003) plane direction is 1:2.5 or more.

5 Claims, 2 Drawing Sheets

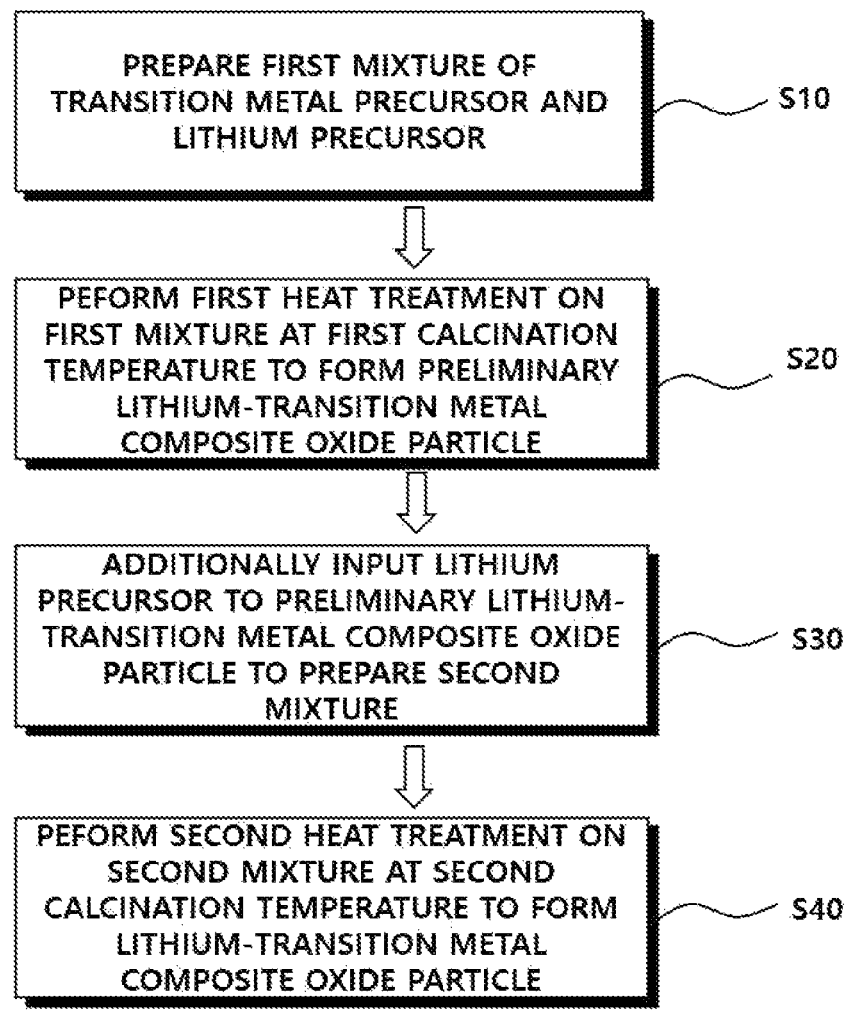

[FIG. 2]
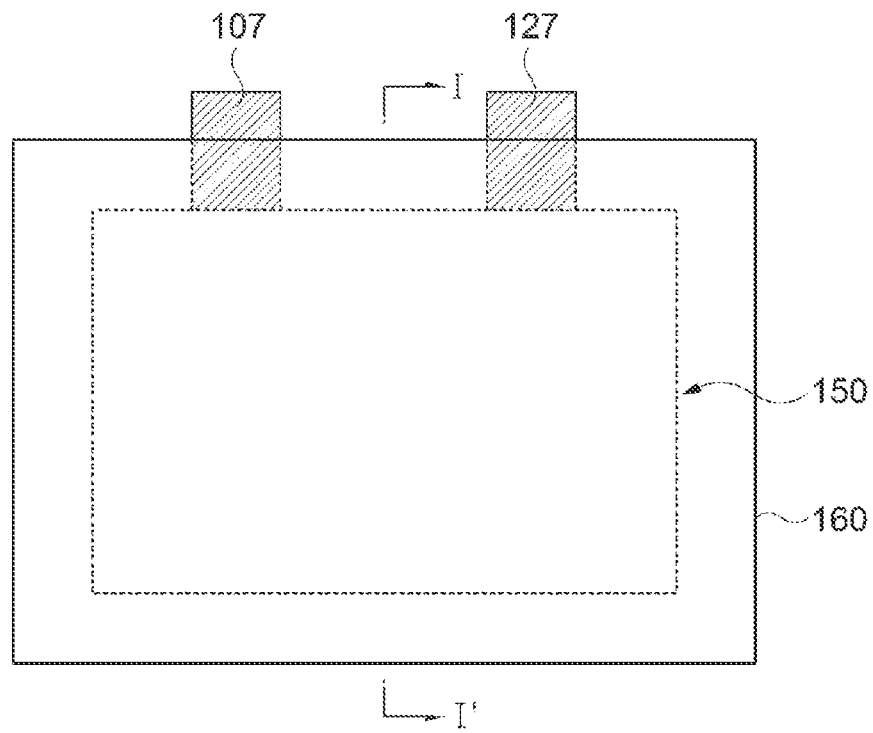
[FIG. 3]
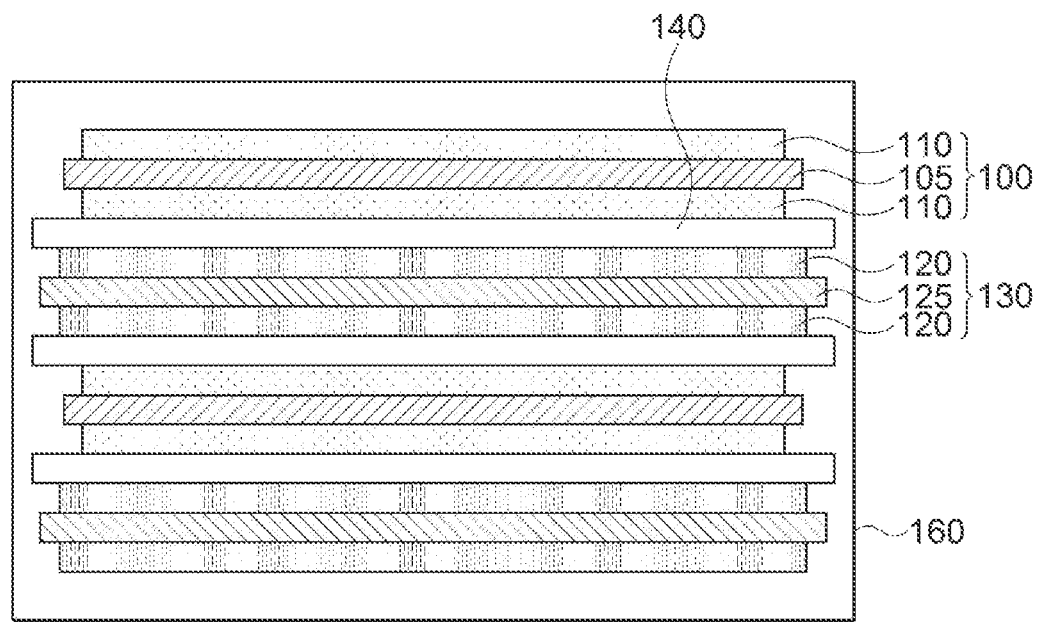

CATHODE ACTIVE MATERIAL FOR LITHIUM SECONDARY BATTERY AND METHOD OF MANUFACTURING THE SAME

CROSS-REFERENCE TO RELATED APPLICATION AND CLAIM OF PRIORITY

This application is a division of U.S. patent application Ser. No. 17/481,535 filed on Sep. 22, 2021, which claims priority to Korean Patent Application No. 10-2020-0124161 filed on Sep. 24, 2020 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a method of manufacturing the same, and more particularly, to a lithium metal oxide-based cathode active material for a lithium secondary battery and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

As a cathode active material of the lithium secondary battery, a lithium metal oxide is used, and conventionally, the lithium metal oxide was manufactured through a method including calcination and water washing processes. However, according to the conventional method of manufacturing a cathode active material, residual metal on a surface of oxide particles is increased, such that life-span characteristics and operational reliability of the lithium secondary battery may be deteriorated.

For example, Korean Patent Registration Publication No. 10-0548988 discloses a method of manufacturing a cathode active material for a lithium secondary battery, but there is a limitation in securing sufficient life-span characteristics and operational stability.

PRIOR ART DOCUMENT

Patent Document

Korean Patent Registration Publication No. 10-0548988

SUMMARY OF THE INVENTION

An object of the present invention is to provide a cathode active material for a lithium secondary battery having excellent operational stability and reliability.

Another object of the present invention is to provide a lithium secondary battery including a cathode active material having excellent operational stability and reliability.

To achieve the above objects, the following technical solutions are adopted in the present invention.

To achieve the above objects, according to an aspect of the present invention, there is provided a method of manufacturing a cathode active material for a lithium secondary battery, including: performing a first heat treatment on a first mixture of a transition metal precursor and a lithium precursor at a first calcination temperature to obtain a preliminary lithium-transition metal composite oxide particle; and performing a second heat treatment on a second mixture obtained by adding the lithium precursor to the preliminary lithium-transition metal composite oxide particle at a second calcination temperature which is lower than the first calcination temperature to form a lithium-transition metal composite oxide particle.

In some embodiments, the lithium-transition metal composite oxide particle may has a composition represented by Formula 1 below:

$$Li_aNi_xM_{1-x}O_{2+y} \qquad \text{[Formula 1]}$$

(in Formula 1, a, x and y are in a range of 0.95≤a≤1.2, 0.6≤x≤0.99, and −0.1≤y≤0.1, respectively, and M is at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr).

In some embodiments, the first calcination temperature may satisfy the Equations 1 and 2 below, and the second calcination temperature satisfies Equations 3 and 4 below:

$$t1 - 10 \le T1(° \text{ C.}) \le t1 + 10 \qquad \text{[Equation 1]}$$

(in Equation 1, t1 is a temperature according to Equation 2 below, and T1 is the first calcination temperature).

$$t1(° \text{ C.}) = (-520)*x + 1275 \qquad \text{[Equation 2]}$$

(in Equation 2, x is the same as x defined in Formula 1).

$$t2 - 10 \le T2(° \text{ C.}) \le t2 + 10 \qquad \text{[Equation 3]}$$

(in Equation 3, t2 is a temperature according to Equation 4 below, and T2 is the second calcination temperature).

$$t2(° C.) = (-520)*x + 1180 \quad \text{[Equation 4]}$$

(in Equation 4, x is the same as x defined in Formula 1. In some embodiments, in Formula 1 above, x may be 0.8 or more.

In some embodiments, the lithium precursor may be input in an amount of 80 to 90 mol % based on the number of moles of the input transition metal precursor in the first mixture, and the lithium precursor may be input in an amount of 10 to 20 mol % based on the number of moles of the input transition metal precursor in the second mixture.

In some embodiments, the transition metal precursor may include a nickel, cobalt and manganese-containing compound.

In some embodiments, the lithium precursor may include at least one of lithium carbonate, lithium nitrate, lithium acetate, lithium oxide, and lithium hydroxide.

In some embodiments, performing a water washing treatment is not comprised.

In some embodiments, the second heat treatment may be performed directly after the first heat treatment.

In addition, according to an aspect of the present invention, there is provided a cathode active material for a lithium secondary battery, including: a lithium-transition metal composite oxide particle, the lithium-transition metal composite oxide particle may have a crystallite size of 120 nm or less in a (104) plane direction measured through X-ray diffraction (XRD) analysis, and a ratio of the crystallite size of the lithium-transition metal composite oxide particle in the (104) plane direction to a crystallite size thereof in a (003) plane direction is 1:2.5 or more, and the crystallite size is measured through Equation 5 below:

$$L = \frac{0.9\lambda}{\beta\cos\theta} \quad \text{[Equation 5]}$$

(in Equation 5, L is the crystallite size (nm), $\lambda$ is an X-ray wavelength (nm), B is full width at half maximum (FWHM) (rad) of a peak of the (003) plane or (104) plane, and $\theta$ is a diffraction angle (rad)).

In some embodiments, a content of lithium carbonate remaining on a surface of the lithium-transition metal composite oxide particle may be 3,000 ppm or less, and a content of lithium hydroxide remaining on the surface of the lithium-transition metal composite oxide particle may be 5,000 ppm or less.

In some embodiments, the lithium-transition metal composite oxide particle may have a crystallite size of 80 to 115 nm in the (104) plane direction.

In some embodiments, a ratio of the crystallite size of the lithium-transition metal composite oxide particle in the (104) plane direction to the crystallite size thereof in the (003) plane direction may be 1:2.5 to 1:3.05.

Further, according to an aspect of the present invention, there is provided a lithium secondary battery including: a cathode which may include a cathode active material layer comprising the aforementioned cathode active material for a lithium secondary battery; an anode; and a separation membrane disposed between the cathode and the anode.

In the method of manufacturing a cathode active material for a lithium secondary battery according to the above-described exemplary embodiments, it is possible to include the calcination steps in two stage. Accordingly, a content of the lithium precursor remaining on the surface of the lithium-transition metal composite oxide particle may be reduced, and life-span characteristics of the lithium secondary battery may be enhanced.

In some embodiments, the calcination temperature in each calcination step may vary depending on the molar ratio or concentration of Ni to be input. Accordingly, the temperature for each calcination step may be appropriately controlled, and initial capacity characteristics and life-span characteristics of the lithium secondary battery may be improved.

In some embodiments, an input amount of the lithium precursor based on the number of moles of the input transition metal precursor may be controlled for each calcination step. Accordingly, the number of moles of Ni input in the first calcination step may be reduced, and thereby the first calcination step may be performed at a higher temperature than the conventional calcination process. In this case, an amount of the lithium precursor remaining on the surface of the lithium-transition metal composite oxide particle may be reduced.

The lithium-transition metal composite oxide particle prepared according to the method of manufacturing a cathode active material may have a crystallite size of 120 nm or less in a (104) plane direction, wherein a ratio of the crystallite size in the (104) plane direction to the crystallite size in a (003) plane direction may be 1:2.5 or more. Accordingly, structural stability of the lithium-transition metal composite oxide particle may be increased, and the lithium secondary battery employing the same allows lithium ions to be stably absorbed and desorbed, such that initial capacity efficiency and life-span characteristics may be improved.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a flowchart for describing processes in a method of manufacturing a cathode active material according to exemplary embodiments; and FIGS. 2 and 3 are a schematic plan view and a cross-sectional view illustrating a lithium secondary battery according to exemplary embodiments, respectively.

DETAILED DESCRIPTION OF THE INVENTION

Embodiments of the present invention provide a method of manufacturing a lithium-transition metal composite oxide particle and a cathode active material including the same, which includes a plurality of calcination steps. In addition, embodiments of the present invention provide a cathode active material including the lithium-transition metal composite oxide particle and a lithium secondary battery including the same.

Hereinafter, exemplary embodiments of the present invention will be described in detail with reference to the accompanying drawings. However, these embodiments are merely an example, and the present invention is not limited to the specific embodiments described as the example.

<Method of Manufacturing Cathode Active Material for Lithium Secondary Battery>

FIG. 1 is a flowchart for describing processes in a method of manufacturing a cathode active material according to exemplary embodiments.

Hereinafter, the method of manufacturing a cathode active material for a lithium secondary battery according to exemplary embodiments will be described with reference to FIG. 1.

Referring to FIG. 1, a first mixture may be prepared by mixing a transition metal precursor and a lithium precursor (e.g., step S10).

The transition metal precursor may include a nickel, cobalt and manganese-containing compound. The transition metal precursor may include, for example, nickel, cobalt and manganese-containing hydroxides, sulfates, acetates, nitrates, and hydrates thereof, etc.

The transition metal precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent while controlling the content or concentration ratio of each metal to prepare an aqueous solution. The aqueous solution may be co-precipitated in a reactor to prepare the transition metal precursor.

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

A temperature of the co-precipitation reaction may be controlled, for example, in a range of about 40° C. to 60° C. A reaction time thereof may be controlled in a range of about 24 to 72 hours.

The lithium precursor compound may include, for example, lithium carbonate, lithium nitrate, lithium acetate, lithium oxide, lithium hydroxide, and the like as a lithium salt. These compounds may be used alone or in combination of two or more thereof.

In exemplary embodiments, a first heat treatment is performed on the obtained first mixture at a first calcination temperature to form preliminary a lithium-transition metal composite oxide particle (e.g., step S20).

In some embodiments, the first calcination temperature may be determined by a molar ratio or concentration of Ni in the finally obtained a lithium-transition metal composite oxide particle.

For example, the lithium-transition metal composite oxide particle may be represented by Formula 1 below.

[Formula 1]

In Formula 1, a, x and y may be in a range of 0.95≤a≤1.2, 0.6≤x≤0.99, and −0.1≤y≤0.1, respectively. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some embodiments, a molar ratio or concentration x of Ni in Formula 1 may be 0.8 or more, and exceeds 0.8 in a preferred embodiment.

Ni may be provided as a transition metal associated with the output and capacity of the lithium secondary battery. Therefore, as described above, by employing the composition of high-nickel (high-Ni) contents in the lithium-transition metal composite oxide particle, it is possible to provide a high-power cathode and a high-power lithium secondary battery.

In this regard, as the content of Ni is increased, long-term storage stability and life-span stability of the cathode or secondary battery may be relatively deteriorated. However, according to exemplary embodiments, by including Co, the life-span stability and capacity retention characteristics may be improved through Mn while maintaining electrical conductivity.

For example, the first calcination temperature may satisfy ranges according to Equations 1 and 2 below.

$$t1 - 10 \leq T1(° C.) \leq t1 + 10 \quad \text{[Equation 1]}$$

In Equation 1, t1 is a temperature obtained by Equation 2 below, and T1 is the first calcination temperature.

$$t1(° C.) = (-520)*x + 1275 \quad \text{[Equation 2]}$$

In Equation 2, x is the same as x defined in Formula 1, for example, x is a molar ratio or concentration of Ni in Formula 1.

For example, when the first calcination temperature T1 is in a range of t1-10° C. or more (i.e., t1−10° C.≤T1) in Equation 1, the content of the lithium precursor remaining on the surface of the prepared a lithium-transition metal composite oxide particle may be decreased, and thereby the initial capacity characteristics of the lithium secondary battery may be improved.

For example, when the first calcination temperature T1 is in a range of t1+10° C. or less (i.e., T1≤t1+10° C.) in Equation 1, a ratio in which the lithium-transition metal composite oxide particle have a hexagonal structure may be increased, and thereby a specific surface area of the lithium-transition metal composite oxide particle may be reduced to improve the life-span characteristics of the lithium secondary battery.

Therefore, when the first calcination temperature satisfies the temperature range of Equation 1, the output characteristics and life-span characteristics of the lithium secondary battery including the lithium-transition metal composite oxide particle as a cathode active material may be improved together.

In exemplary embodiments, a second mixture may be prepared by additionally inputting a lithium precursor to the obtained preliminary a lithium-transition metal composite oxide particle (e.g., step S30).

In exemplary embodiments, a second heat treatment is performed on the obtained second mixture at a second calcination temperature to form a lithium-transition metal composite oxide particle (e.g., step S40).

In some embodiments, the second calcination temperature may be determined by the molar ratio or concentration of Ni in the finally obtained the lithium-transition metal composite oxide particle.

For example, the second calcination temperature may satisfy ranges according to Equations 3 and 4 below.

$$t2 - 10 \le T2(°\ C.) \le t2 + 10 \quad \text{[Equation 3]}$$

In Equation 3, t2 is a temperature obtained by Equation 4 below, and T2 is the second calcination temperature.

$$t2(°\ C.) = (-520)*x + 1180 \quad \text{[Equation 4]}$$

In Equation 4, x is the same as x defined in Formula 1, for example, x is the molar ratio or concentration of Ni in Formula 1.

For example, when the second calcination temperature T2 is in a range of t2-10° C. or more (i.e., t2−10° C.≤T2) in Equation 3, the content of the lithium precursor remaining on the surface of the prepared lithium-transition metal composite oxide particle may be decreased, and thereby the initial capacity characteristics of the lithium secondary battery may be improved.

For example, when the second calcination temperature T2 is in a range of t2+10° C. or less (i.e., T2≤t2+10° C.) in Equation 3, the ratio in which the lithium-transition metal composite oxide particle has a hexagonal structure may be increased, and thereby a specific surface area of the lithium-transition metal composite oxide particle may be reduced to improve the life-span characteristics of the lithium secondary battery.

Therefore, when the second calcination temperature satisfies the temperature range of Equation 3, the output characteristics and life-span characteristics of the lithium secondary battery including the lithium-transition metal composite oxide particle as a cathode active material may be improved together.

Conventionally, in order for the lithium-transition metal composite oxide particle to have a hexagonal structure when preparing the lithium-transition metal composite oxide particle, the calcination temperature may be decreased as the input amount of Ni is increased.

In some embodiments, only a portion of the total number of moles of the lithium precursor may be input when preparing the first mixture, and the remainder thereof may be input when preparing the second mixture. In this case, the amount of the transition metal precursor reacting with the lithium precursor in the first heat treatment process may be decreased, such that the number of moles of the input Ni may also be decreased. Accordingly, the first heat treatment process may be performed at a higher temperature than the conventional calcination process, and the amount of the lithium precursor remaining on the surface of the lithium-transition metal composite oxide particle may be reduced.

For example, 80 to 90 mol % of the lithium precursor may be input in the first calcination step based on the number of moles of the transition metal precursor to be input, and 10 to 20 mol % thereof may be input in the second calcination step based on the number of moles of the transition metal precursor to be input.

When the input ratio of the lithium precursor satisfies the above range, a decrease in life-span characteristics due to cracks of the preliminary lithium-transition metal composite oxide particle and a decrease in output characteristics due to the lithium precursor remaining on the surface of the lithium-transition metal composite oxide particle may be prevented.

The conventional process of manufacturing a lithium-transition metal composite oxide particle may further include a water washing process. In this case, at least some particles on the surface and inside of the lithium-transition metal composite oxide may be changed from a hexagonal structure to a cubic structure. Accordingly, voids are formed between the particles to cause an increase in the specific surface area of the particles, such that the capacity characteristics and life-span characteristics at a high temperature may be deteriorated.

However, since the method of manufacturing the lithium-transition metal composite oxide particle according to exemplary embodiments of the present invention includes the first heat treatment process performed at a relatively high temperature, lithium precursor remaining on the surface of the lithium-transition metal composite oxide particle may be reduced. Accordingly, the method of the present invention may not include the water washing process for removing the lithium precursor remaining on the surface of the lithium-transition metal composite oxide particle, thereby an increase in the specific surface area of the particles may be prevented, and storage properties and stability at a high temperature may be increased.

In exemplary embodiments, the cathode active material may include the above-described lithium-transition metal composite oxide particle.

<Cathode Active Material for Lithium Secondary Battery and Lithium Secondary Battery>

According to embodiments of the present invention, a cathode active material prepared by the above-described method of manufacturing a cathode active material for a lithium secondary battery may be provided.

In some embodiments, the cathode active material or the lithium-transition metal composite oxide particle may further include a coating element or doping element. For example, the coating element or doping element may include Al, Ti, Ba, Zr, Si, B, Mg, P, or an alloy thereof or an oxide thereof. These may be used alone or in combination of two or more thereof. The cathode active material particles are passivated by the coating or doping element, thereby stability and life-span for penetration of an external object may be more improved.

In some embodiments, the content of lithium carbonate remaining on the surface of the lithium-transition metal composite oxide particle included in the cathode active material may be 3,000 ppm or less, and the content of lithium hydroxide remaining on the surface of the lithium-transition metal composite oxide particle may be 5,000 ppm or less.

When the content of the residual lithium precursor satisfies the above range, electron transfer of the cathode active material may be smoothly implemented, such that the initial capacity characteristics and output characteristics of the lithium secondary battery may be improved.

In some embodiments, the lithium-transition metal composite oxide particle may have a crystallite size (CS) of 120 nm or less in a (104) plane direction.

When the crystallite size is 120 nm or less, structural stability of the lithium-transition metal composite oxide particle may be increased, and the lithium secondary battery employing the same allows lithium ions to be stably absorbed and desorbed, such that capacity retention rate during repeated cycles may be enhanced.

In some embodiments, the crystallite size in the (104) plane direction may be 80 to 115 nm. In the above range, it is possible to effectively maintain thermal stability and life-span characteristics while sufficiently implementing high output and high capacity through the composition of high-nickel (high-Ni) contents.

In some embodiments, as the calcination temperature is increased, crystallites of the lithium-transition metal composite oxide particle in a (003) plane may be grown faster than the crystallites thereof in the (104) plane. Accordingly, as the calcination temperature is increased, a ratio of the crystallite size of the lithium-transition metal composite oxide particle in the (104) plane direction to the crystallite size thereof in the (003) plane direction may be decreased.

For example, the ratio of the crystallite size of the lithium-transition metal composite oxide particle in the (104) plane direction to the crystallite size thereof in the (003) plane direction may be 1:2.5 or more. In this case, an input/output path of Li may be shortened, and thereby initial capacity and capacity efficiency may be increased.

In some embodiments, the crystallite size ratio may be 1:2.5 to 1:3.05. When satisfying the above range, it is possible to suppress the crystallite size of the lithium-transition metal composite oxide particle in the (003) plane direction from being grown significantly larger than the crystallite size in the (104) plane direction, thus to prevent a deterioration in the structural stability, as well as the above-described excellent initial capacity and efficiency may be implemented, and thereby excellent life-span characteristics and output characteristics may be implemented together.

In exemplary embodiments, the "crystallite size" is a numerical value measured through X-ray diffraction (XRD) analysis. The crystallite size may be calculated and obtained through the Scherrer equation (Equation 5 below) using a full width at half maximum (FWHM) obtained through the XRD analysis.

$$L = \frac{0.9\lambda}{\beta \cos\theta}$$ [Equation 5]

In Equation 5 above, L represents the crystallite size (nm), $\lambda$ represents an X-ray wavelength (nm), $\beta$ represents the full width at half maximum (FWHM) (rad) of the corresponding peak, and $\theta$ represents a diffraction angle (rad). According to exemplary embodiments, the full width at half maximum in XRD analysis for measuring the crystallite size may be measured from the peak of the (104) plane when calculating the crystallite size in the (104) plane direction, and from the peak of the (003) plane when calculating the crystallite size in the (003) plane direction.

In some embodiments, $\beta$ in Equation 5 above may use the full width at half maximum corrected for a value derived from equipment. In one embodiment, Si may be used as a standard material for reflecting the equipment-derived value. In this case, by plotting full width at half maximum profiles in a full range of 2θ of Si, the equipment-derived full width at half maximum may be represented as a function of 2θ. Thereafter, a value corrected by subtracting the equipment-derived full width at half maximum value in the corresponding 2θ obtained from the above function may be used as $\beta$.

For example, the XRD analysis may be performed by using Cu-Kα rays as a light source for the dried powder of the lithium-transition metal composite oxide particle in a diffraction angle (2θ) range of 10° to 120° at a scan rate of 0.0065°/step.

FIGS. 2 and 3 are a schematic plan view and a cross-sectional view illustrating a lithium secondary battery according to exemplary embodiments, respectively. Hereinafter, a lithium secondary battery including the above-described cathode active material for a lithium secondary battery will be described with reference to FIGS. 2 and 3.

Referring to FIGS. 2 and 3, the lithium secondary battery may include an electrode assembly including a cathode 100, an anode 130, and a separation membrane 140 interposed between the cathode and the anode. The electrode assembly may be housed in a case 160 together with an electrolyte to be impregnated.

The cathode 100 may include a cathode active material layer 110 formed by applying the above-described cathode active material to a cathode current collector 105.

A slurry may be prepared by mixing and stirring the cathode active material including the above-described lithium-transition metal composite oxide particle with a binder, a conductive material and/or a dispersant in a solvent. The slurry may be coated on the cathode current collector 105, followed by drying and compressing to manufacture the cathode 100.

The cathode current collector 105 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode current collector 125 may include, for example, gold, stainless steel, nickel, aluminum, titanium, copper, or an alloy thereof, and preferably includes copper or a copper alloy.

The anode active material useable in the present invention may include any material known in the related art, so long as it can absorb and desorb lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, mesocarbon microbead (MCMB), mesophase pitch-based carbon fiber (MPCF) or the like.

Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The silicon compound may include, for example, a silicon-carbon composite compound such as silicon oxide or silicon carbide (SiC).

For example, a form of slurry may be prepared by mixing the anode active material with a binder, a conductive material and/or thickener in a solvent, followed by stirring the same. The slurry may be coated on at least one surface of the anode current collector 125, followed by drying and compressing to manufacture the anode 130.

As the binder and the conductive material, materials which are substantially the same as or similar to the above-described materials used in the cathode active material layer 110 may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

A separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer. The separation membrane 140 may include a nonwoven fabric made of glass fiber having a high melting point, polyethylene terephthalate fiber or the like.

In some embodiments, the anode 130 may have an area (e.g., a contact area with the separation membrane 140) and/or volume larger than those/that of the cathode 100. Thereby, lithium ions generated from the cathode 100 may smoothly move to the anode 130 without being precipitated in the middle, for example.

According to exemplary embodiments, an electrode cell is defined by the cathode 100, the anode 130, and the separation membrane 140, and a plurality of electrode cells are stacked to form, for example, a jelly roll type electrode assembly 150. For example, the electrode assembly 150 may be formed by winding, laminating, folding, or the like of the separation membrane 140.

The electrode assembly 150 may be housed in the case 160 together with an electrolyte to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, LiX—, and as an anion (X—) of the lithium salt, F—, Cl—, Br—, I—, $NO_3$—, $N(CN)_2$—, $BF_4$—, $ClO_4$—, $PF_6$—, $(CF_3)_2PF_4$—, $(CF_3)_3PF_3$—, $(CF_3)_4PF_2$—, $(CF_3)_5PF$—, $(CF_3)_6P$—, $CF_3SO_3$—, $CF_3CF_2SO_3$—, $(CF_3SO_2)_2N$—, $(FSO_2)_2N$—, $CF_3CF_2(CF_3)_2CO$—, $(CF_3SO_2)_2CH$—, $(SF_5)_3C$—, $(CF_3SO_2)_3C$—, $CF_3(CF_2)_7SO_3$—, $CF_3CO_2$—, $CH_3CO_2$—, SCN— and $(CF_3CF_2SO_2)_2N$—, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As shown in FIG. 2, electrode tabs (a cathode tab and an anode tab) may protrude from the cathode current collector 105 and the anode current collector 125, respectively, which belong to each electrode cell, and may extend to one side of the case 160. The electrode tabs may be fused together with the one side of the case 160 to form electrode leads (a cathode lead 107 and an anode lead 127) extending or exposed to an outside of the case 160.

The lithium secondary battery may be manufactured, for example, in a cylindrical shape using a can, a square shape, a pouch type or a coin shape.

In exemplary embodiments, the above-described lithium secondary battery may be manufactured in the coin shape.

For example, the cathode and the anode may be notched in a circular shape having a diameter of ϕ14 or ϕ16 and laminated. For example, the separation membrane may be interposed between the cathode and the anode to form the electrode assembly.

For example, a coin-type lithium secondary battery may be manufactured by placing the electrode assembly in a coin cell case, then injecting an electrolyte and assembling the same.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Example 1

Preparation of a Lithium-Transition Metal Composite Oxide Particle $NiSO_4$, $CoSO_4$ and $MnSO_4$ were mixed in a ratio of 0.885:0.09:0.025, using distilled water from which internal dissolved oxygen is removed by bubbling with $N_2$ for 24 hours. The solution was introduced into a reactor at 50° C., and a co-precipitation reaction was performed for 48 hours using NaOH and $NH_3H_2O$ as a precipitant and a chelating agent to obtain $Ni_{0.885}Co_{0.09}Mn_{0.025}(OH)_2$ as a transition metal precursor. The obtained precursor was dried at 80° C. for 12 hours, and then again dried at 110° C. for 12 hours.

In a first calcination step, lithium hydroxide and the transition metal precursor were put into a dry high-speed mixer by adding them so that the number of moles of lithium hydroxide based on the number of moles of the transition metal precursor was 85 mole %, followed by uniformly stirring and mixing the same for 5 minutes. The mixture was put into a calcination furnace, heated to 805° C. (a first calcination temperature) at a heating rate of 2° C./min, and maintained at 805° C. for 5 hours. Oxygen was passed continuously at a flow rate of 10 mL/min during heating and maintenance. After completion of the calcination, the mixture was naturally cooled to room temperature, followed by grinding and classification to prepare a preliminary lithium-transition metal composite oxide particle.

In a second calcination step, lithium hydroxide was put into the dry high-speed mixer by adding it to the preliminary lithium-transition metal composite oxide particle in an amount of 16 mol % based on the number of moles of the transition metal precursor input in the first calcination step, followed by uniformly stirring and mixing the same for 5 minutes. The mixture was put into the calcination furnace, heated to 710° C. (a second calcination temperature) at a heating rate of 2° C./min, and maintained at 710° C. for 5 hours. Oxygen was passed continuously at a flow rate of 10 mL/min during heating and maintenance. After completion of the calcination, the mixture was naturally cooled to room temperature, followed by grinding and classification to prepare the lithium-transition metal composite oxide particle in a form of single particles of the cathode active material $LiNi_{0.885}Co_{0.09}Mn_{0.025}O_2$.

Manufacture of Lithium Secondary Battery

A secondary battery was manufactured using the lithium-transition metal composite oxide particle prepared above as a cathode active material. Specifically, the cathode active materials, Denka Black as a conductive material and PVDF as a binder were mixed in a mass ratio composition of 93:5:2, respectively, to prepare a cathode slurry. Then, the slurry was applied to an aluminum current collector, followed by drying and pressing the same to prepare a cathode. After the pressing, an electrode density of the cathode was controlled in a range of 2.9 to 3.1 g/cc.

Lithium Metal was Used as an Anode.

The cathode and anode prepared as described above were notched in a circular shape having a diameter of ϕ14 and ϕ16, respectively, and laminated, then an electrode cell was prepared by disposing a separator (polyethylene, thickness: 13 μm) notched to ϕ19 between the cathode and the anode. The prepared electrode cell was put into a coin cell case having a specification of diameter of 20t and a height of 1.6t, then an electrolyte was injected and assembled, followed by aging for 12 hours or more so that the electrolyte could be impregnated inside the electrodes.

The electrolyte used herein was prepared by dissolving 1M $LiPF_6$ in a mixed solvent of EC/EMC (30/70; volume ratio).

The secondary battery manufactured as described above was subjected to chemical charging-discharging (charge condition: CC-CV 0.1C 4.3 V 0.005C CUT-OFF, discharge condition: CC 0.1C 3 V CUT-OFF).

For reference, when calculating by substituting 0.885, which is a molar ratio of Ni, in Equations 1 to 4, the calcination temperature range of the first calcination step is 805 to 825° C., and the calcination temperature range of the second calcination step is 710 to 730° C.

Example 2

A lithium-transition metal composite oxide particle and a lithium secondary battery using the same as a cathode active material were manufactured according to the same procedures as described in Example 1, except that the second calcination temperature was set to 720° C.

Example 3

A lithium-transition metal composite oxide particle and a lithium secondary battery using the same as a cathode active material were manufactured according to the same procedures as described in Example 1, except that the second calcination temperature was set to 730° C.

Example 4

A lithium-transition metal composite oxide particle and a lithium secondary battery using the same as a cathode active material were manufactured according to the same procedures as described in Example 1, except that the first calcination temperature was set to 815° C.

Example 5

A lithium-transition metal composite oxide particle and a lithium secondary battery using the same as a cathode active material were manufactured according to the same procedures as described in Example 4, except that the second calcination temperature was set to 720° C.

Example 6

A lithium-transition metal composite oxide particle and a lithium secondary battery using the same as a cathode active material were manufactured according to the same procedures as described in Example 4, except that the second calcination temperature was set to 730° C.

Example 7

A lithium-transition metal composite oxide particle and a lithium secondary battery using the same as a cathode active material were manufactured according to the same procedures as described in Example 1, except that the first calcination temperature was set to 825° C.

Example 8

A lithium-transition metal composite oxide particle and a lithium secondary battery using the same as a cathode active material were manufactured according to the same procedures as described in Example 7, except that the second calcination temperature was set to 720° C.

Example 9

A lithium-transition metal composite oxide particle and a lithium secondary battery using the same as a cathode active material were manufactured according to the same procedures as described in Example 7, except that the second calcination temperature was set to 730° C.

Example 10

A lithium-transition metal composite oxide particle and a lithium secondary battery using the same as a cathode active material were manufactured according to the same procedures as described in Example 5, except that the number of moles of lithium hydroxide input in the first calcination step based on the number of moles of the input transition metal precursor was 80 mol %, and the number of moles of lithium hydroxide input in the second calcination step based on the number of moles of the input transition metal precursor was 21 mole %.

Example 11

A lithium-transition metal composite oxide particle and a lithium secondary battery using the same as a cathode active material were manufactured according to the same procedures as described in Example 5, except that the number of moles of lithium hydroxide input in the first calcination step based on the number of moles of the input transition metal precursor was 90 mol %, and the number of moles of lithium hydroxide input in the second calcination step based on the number of moles of the input transition metal precursor was 11 mole %.

Comparative Example 1

A lithium-transition metal composite oxide particle and a lithium secondary battery using the same as a cathode active material were manufactured according to the same procedures as described in Example 1, except that the second calcination temperature was set to 700° C.

Comparative Example 2

A lithium-transition metal composite oxide particle and a lithium secondary battery using the same as a cathode active material were manufactured according to the same procedures as described in Example 1, except that the second calcination temperature was set to 740° C.

Comparative Example 3

A lithium-transition metal composite oxide particle and a lithium secondary battery using the same as a cathode active material were manufactured according to the same procedures as described in Example 4, except that the second calcination temperature was set to 700° C.

Comparative Example 4

A lithium-transition metal composite oxide particle and a lithium secondary battery using the same as a cathode active material were manufactured according to the same procedures as described in Example 4, except that the second calcination temperature was set to 740° C.

Comparative Example 5

A lithium-transition metal composite oxide particle and a lithium secondary battery using the same as a cathode active material were manufactured according to the same procedures as described in Example 7, except that the second calcination temperature was set to 700° C.

Comparative Example 6

A lithium-transition metal composite oxide particle and a lithium secondary battery using the same as a cathode active material were manufactured according to the same procedures as described in Example 7, except that the second calcination temperature was set to 740° C.

Comparative Example 7

A lithium-transition metal composite oxide particle and a lithium secondary battery using the same as a cathode active material were manufactured according to the same procedures as described in Example 2, except that the first calcination temperature was set to 800° C.

Comparative Example 8

A lithium-transition metal composite oxide particle and a lithium secondary battery using the same as a cathode active material were manufactured according to the same procedures as described in Example 2, except that the first calcination temperature was set to 695° C.

Comparative Example 9

A lithium-transition metal composite oxide particle and a lithium secondary battery using the same as a cathode active material were manufactured according to the same procedures as described in Example 2, except that the first calcination temperature was set to 835° C.

Comparative Example 10

A lithium-transition metal composite oxide particle and a lithium secondary battery using the same as a cathode active material were manufactured according to the same procedures as described in Example 10, except that the number of moles of lithium hydroxide input in the first calcination step based on the number of moles of the input transition metal precursor was 75 mol %, and the number of moles of lithium hydroxide input in the second calcination step based on the number of moles of the input transition metal precursor was 26 mole %.

Comparative Example 11

A lithium-transition metal composite oxide particle and a lithium secondary battery using the same as a cathode active material were manufactured according to the same procedures as described in Example 10, except that the number of moles of lithium hydroxide input in the first calcination step based on the number of moles of the input transition metal precursor was 95 mol %, and the number of moles of lithium hydroxide input in the second calcination step based on the number of moles of the input transition metal precursor was 6 mole %.

Comparative Example 12

A lithium-transition metal composite oxide particle and a lithium secondary battery using the same as a cathode active material were manufactured according to the same procedures as described in Example 1, except that: a single calcination step was performed; lithium hydroxide and transition metal precursor were added in a ratio of 1.01:1 in the single calcination step; calcination was performed at 710° C. in the single calcination step; and water washing treatment was performed after completion of the calcination.

Comparative Example 13

A lithium-transition metal composite oxide particle and a lithium secondary battery using the same as a cathode active material were manufactured according to the same procedures as described in Comparative Example 12, except that calcination was performed at 720° C. in the single calcination step.

Comparative Example 14

A lithium-transition metal composite oxide particle and a lithium secondary battery using the same as a cathode active material were manufactured according to the same procedures as described in Comparative Example 12, except that calcination was performed at 730° C. in the single calcination step.

The calcination temperatures)(° C. in the first and second calcination steps and the input amount (mol %) of lithium hydroxide based on the number of moles of the transition metal precursor in the examples and comparative examples are shown in Tables 1 and 2 below.

TABLE 1

| Section | First calcination temperature (° C.) | Input amount (mol %) of lithium hydroxide based on the number of moles of transition metal precursor in first calcination step | Second calcination temperature (° C.) | Input amount (mol %) of lithium hydroxide based on the number of moles of transition metal precursor in second calcination step |
|---|---|---|---|---|
| Example 1 | 805 | 85 | 710 | 16 |
| Example 2 | 805 | 85 | 720 | 16 |
| Example 3 | 805 | 85 | 730 | 16 |
| Example 4 | 815 | 85 | 710 | 16 |
| Example 5 | 815 | 85 | 720 | 16 |
| Example 6 | 815 | 85 | 730 | 16 |
| Example 7 | 825 | 85 | 710 | 16 |
| Example 8 | 825 | 85 | 720 | 16 |
| Example 9 | 825 | 85 | 730 | 16 |
| Example 10 | 815 | 80 | 720 | 21 |
| Example 11 | 815 | 90 | 720 | 11 |

TABLE 2

| Section | First calcination temperature (° C.) | Input amount (mol %) of lithium hydroxide based on the number of moles of transition metal precursor in first calcination step | Second calcination temperature (° C.) | Input amount (mol %) of lithium hydroxide based on the number of moles of transition metal precursor in second calcination step |
|---|---|---|---|---|
| Comparative Example 1 | 805 | 85 | 700 | 16 |
| Comparative Example 2 | 805 | 85 | 740 | 16 |
| Comparative Example 3 | 815 | 85 | 700 | 16 |
| Comparative Example 4 | 815 | 85 | 740 | 16 |
| Comparative Example 5 | 825 | 85 | 700 | 16 |
| Comparative Example 6 | 825 | 85 | 740 | 16 |
| Comparative Example 7 | 800 | 85 | 720 | 16 |
| Comparative Example 8 | 695 | 85 | 720 | 16 |
| Comparative Example 9 | 835 | 85 | 720 | 16 |
| Comparative Example 10 | 815 | 75 | 720 | 26 |
| Comparative Example 11 | 815 | 95 | 720 | 6 |
| Comparative Example 12 | 710 | 101 | — | — |
| Comparative Example 13 | 720 | 101 | — | — |
| Comparative Example 14 | 730 | 101 | — | — |

Experimental Example (1) Measurement of Content of Lithium Precursors (LiOH, $Li_2CO_3$) Remaining on Surface of Lithium-Transition Metal Composite Oxide Particles 5.0 g of lithium metal oxide particles of the examples and comparative examples were quantified in a 250 mL flask and 100 g of deionized water was added thereto, then a magnetic bar was put into the flask, followed by stirring the mixture at a speed of 4 rpm for 10 minutes. Thereafter, 50 g of the solution was sampled after filtering using a flask at reduced pressure. The sampled solution was put into a container of automatic titrator and automatically titrated with 0.1N HCl referring to the Wader's method to measure LiOH and $Li_2CO_3$ values in the solution.

(2) Measurement of Crystallite Size and Calculation of Crystallite Size Ratio

After performing XRD analysis on the lithium-transition metal composite oxide particle used as the cathode active material in the above-described examples and comparative examples under XRD analysis equipment/conditions according to Table 3 below, crystallite sizes (CS (104)) in a (104) plane direction and crystallite sizes (CS(003)) in a (003) plane direction were calculated by substituting the measured values into Equation 5, followed by dividing to obtain a ratio of two crystallite sizes (CS (003)/CS (104)).

TABLE 3

| XRD (X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10-120° |
| Scan Step Size | 0.0065° |
| Divergence slit | ¼° |
| Antiscatter slit | ½° |

(3) Measurement of Initial Charge/Discharge Capacity and Calculation of Initial Capacity Efficiency After charging (CC-CV 0.1C 4.3 V 0.005C CUT-OFF) the lithium secondary batteries manufactured according to the above-described examples and comparative examples in a chamber at 25° C., battery capacities (initial charge capacities) were measured, and after discharging again (CC 0.1C 3.0 V CUT-OFF) the same, the battery capacities (initial discharge capacities) were measured.

Initial capacity efficiency of each lithium secondary battery was calculated by dividing the measured initial discharge capacity by the measured initial charge capacity, then multiplying by 100.

(4) Measurement of Battery Life-Span Characteristics (Capacity Retention Rate)

After repeatedly charging (CC-CV 0.5C 4.3 V 0.05C CUT-OFF) and discharging (CC 1.0C 3.0 V CUT-OFF) the above-described lithium secondary batteries of the examples and the comparative examples 300 times in a chamber at 45° C., capacity retention rates after 300 cycles were evaluated by calculating the discharge capacity at 300 times as a percentage (%) based on the discharge capacity at one time.

The measured and calculated results are shown in Tables 4 and 5 below.

TABLE 4

| Section | LiOH (ppm) | $Li_2CO_3$ (ppm) | CS (003) (nm) | CS (104) (nm) | CS (003)/ CS (104) | Initial charge capacity (mAh/g) | Initial discharge capacity (mAh/g) | Initial capacity efficiency (%) | Capacity retention rate (%) |
|---|---|---|---|---|---|---|---|---|---|
| Example 1 | 4900 | 2990 | 225 | 87 | 2.59 | 238.9 | 212.0 | 88.7 | 74 |
| Example 2 | 4750 | 2650 | 256 | 98 | 2.61 | 239.6 | 212.6 | 88.7 | 73 |
| Example 3 | 4820 | 2120 | 277 | 105 | 2.64 | 239.5 | 214.2 | 89.4 | 66 |
| Example 4 | 4640 | 2640 | 245 | 97 | 2.53 | 240.4 | 213.1 | 88.6 | 72 |
| Example 5 | 4480 | 2230 | 276 | 104 | 2.65 | 239.6 | 215.2 | 89.8 | 71 |
| Example 6 | 4030 | 1990 | 306 | 107 | 2.86 | 240.2 | 215.3 | 89.6 | 64 |
| Example 7 | 4200 | 2230 | 259 | 100 | 2.59 | 240.9 | 212.1 | 88.0 | 70 |
| Example 8 | 4040 | 1690 | 294 | 107 | 2.75 | 240.1 | 212.4 | 88.5 | 67 |
| Example 9 | 3590 | 1550 | 341 | 117 | 2.91 | 240.2 | 213.8 | 89.0 | 61 |
| Example 10 | 4450 | 2400 | 270 | 103 | 2.62 | 239.3 | 214.9 | 89.8 | 70 |
| Example 11 | 4110 | 2190 | 292 | 111 | 2.63 | 239.5 | 215.0 | 89.8 | 71 |

TABLE 5

| Section | LiOH (ppm) | $Li_2CO_3$ (ppm) | CS (003) (nm) | CS (104) (nm) | CS (003)/ CS (104) | Initial charge capacity (mAh/g) | Initial discharge capacity (mAh/g) | Initial capacity efficiency (%) | Capacity retention rate (%) |
|---|---|---|---|---|---|---|---|---|---|
| Comparative Example 1 | 6140 | 3890 | 189 | 79 | 2.39 | 239.4 | 210.1 | 87.8 | 71 |
| Comparative Example 2 | 4390 | 2090 | 340 | 122 | 2.79 | 240.2 | 213.2 | 88.8 | 59 |
| Comparative Example 3 | 5800 | 3750 | 209 | 86 | 2.43 | 239.5 | 211.6 | 88.4 | 61 |
| Comparative Example 4 | 3940 | 1820 | 389 | 129 | 3.02 | 240.1 | 214.1 | 89.2 | 58 |

TABLE 5-continued

| Section | LiOH (ppm) | Li₂CO₃ (ppm) | CS (003) (nm) | CS (104) (nm) | CS (003)/ CS (104) | Initial charge capacity (mAh/g) | Initial discharge capacity (mAh/g) | Initial capacity efficiency (%) | Capacity retention rate (%) |
|---|---|---|---|---|---|---|---|---|---|
| Comparative Example 5 | 5480 | 3310 | 220 | 91 | 2.42 | 240.5 | 211.2 | 87.8 | 59 |
| Comparative Example 6 | 3500 | 1380 | 409 | 136 | 3.01 | 240.0 | 214.2 | 89.3 | 51 |
| Comparative Example 7 | 4850 | 3070 | 225 | 98 | 2.29 | 239.6 | 211.7 | 88.4 | 73 |
| Comparative Example 8 | 4990 | 3110 | 201 | 97 | 2.07 | 239.6 | 211.3 | 88.2 | 74 |
| Comparative Example 9 | 3870 | 1680 | 373 | 122 | 3.06 | 240.5 | 213.4 | 88.7 | 48 |
| Comparative Example 10 | 5010 | 3200 | 249 | 101 | 2.47 | 239.4 | 212.1 | 88.6 | 38 |
| Comparative Example 11 | 3890 | 2140 | 333 | 123 | 2.71 | 239.1 | 215.1 | 90.0 | 48 |
| Comparative Example 12 | 9450 | 5150 | 183 | 86 | 2.13 | 239.4 | 204.1 | 85.3 | 80 |
| Comparative Example 13 | 7320 | 5670 | 233 | 101 | 2.31 | 240.5 | 208.3 | 86.6 | 73 |
| Comparative Example 14 | 7280 | 4770 | 260 | 107 | 2.43 | 240.1 | 210.9 | 87.8 | 66 |

Referring to Tables 4 and 5, in the case of the examples using the lithium-transition metal composite oxide particle prepared through two-stage calcination, wherein the two-stage calcination was performed in the temperature range calculated by Equations 1 to 4, and the input ratio of lithium precursor for each calcination step was within a predetermined range, the content of lithium precursor remaining on the surface of the lithium-transition metal composite oxide particle was reduced, and excellent initial capacity and capacity retention rate were secured as a whole compared to the comparative examples.

DESCRIPTION OF REFERENCE NUMERALS

100: Cathode
105: Cathode current collector
110: Cathode active material layer
120: Anode active material layer
125: Anode current collector
130: Anode
140: Separation membrane
160: Case

What is claimed is:

1. A cathode active material for a lithium secondary battery, comprising:
    a lithium-transition metal composite oxide particle,
    wherein a molar ratio of Ni in the lithium-transition metal composite oxide particle is 0.8 or more,
    wherein the lithium-transition metal composite oxide particle has a crystallite size of 120 nm or less in a (104) plane direction measured through X-ray diffraction (XRD) analysis, and a ratio of the crystallite size of the lithium-transition metal composite oxide particle in the (104) plane direction to a crystallite size thereof in a (003) plane direction is 1:2.5 or more, and the crystallite size is measured through Equation 5 below:

$$L = \frac{0.9\lambda}{\beta\cos\theta} \quad \text{[Equation 5]}$$

wherein L is the crystallite size in nm, λ is an X-ray wavelength in nm, β is full width at half maximum (FWHM) in radian of a peak of the (003) plane or (104) plane, and θ is a diffraction angle in radian.

2. The cathode active material for a lithium secondary battery according to claim 1, wherein a content of lithium carbonate remaining on a surface of the lithium-transition metal composite oxide particle is 3,000 ppm or less, and a content of lithium hydroxide remaining on the surface of the lithium-transition metal composite oxide particle is 5,000 ppm or less.

3. The cathode active material for a lithium secondary battery according to claim 1, wherein the lithium-transition metal composite oxide particle has a crystallite size of 80 to 115 nm in the (104) plane direction.

4. The cathode active material for a lithium secondary battery according to claim 1, wherein a ratio of the crystallite size of the lithium-transition metal composite oxide particle in the (104) plane direction to the crystallite size thereof in the (003) plane direction is 1:2.5 to 1:3.05.

5. A lithium secondary battery comprising:
    a cathode including a cathode active material layer having the cathode active material for a lithium secondary battery according to claim 1;
    an anode; and
    a separation membrane disposed between the cathode and the anode.

* * * * *